(12) United States Patent
Noone et al.

(10) Patent No.: US 6,414,448 B1
(45) Date of Patent: Jul. 2, 2002

(54) ELECTRONIC BALLAST FOR A GAS DISCHARGE LAMP

(75) Inventors: Sean Noone; Thomas Durkan, both of Mayo; Michael Quinlan; Paul McCarthy, both of Limerick, all of (IE)

(73) Assignee: Noontek Limited, Bellmullet County Mayo (IE)

( * ) Notice: Subject to any disclaimer, the term of this patent is extended or adjusted under 35 U.S.C. 154(b) by 0 days.

(21) Appl. No.: 09/463,302

(22) PCT Filed: Jul. 23, 1998

(86) PCT No.: PCT/IE98/00065
§ 371 (c)(1),
(2), (4) Date: May 10, 2000

(87) PCT Pub. No.: WO99/05889
PCT Pub. Date: Feb. 4, 1999

(30) Foreign Application Priority Data

Jul. 24, 1997 (IE) .............................................. S970540
Jul. 31, 1997 (IE) .............................................. S970561
May 15, 1998 (IE) .............................................. S980368

(51) Int. Cl.$^7$ ................................................. G05F 1/00
(52) U.S. Cl. ................... 315/291; 315/307; 315/209 R; 315/DIG. 7; 315/221
(58) Field of Search .............................. 315/307, 291, 315/292, 293, 209 R, 221, DIG. 5, DIG. 7, DIG. 2, 224

(56) References Cited

U.S. PATENT DOCUMENTS

| | | | |
|---|---|---|---|
| 4,484,190 A | | 11/1984 | Bedard .................... 340/825.57 |
| 5,128,592 A | | 7/1992 | Dean et al. .................. 315/224 |
| 5,463,287 A | * | 10/1995 | Kurihara et al. ............ 315/308 |
| 5,493,182 A | * | 2/1996 | Sowa et al. .................. 315/291 |
| 5,598,326 A | * | 1/1997 | Liu et al. ........................ 363/34 |
| 5,604,411 A | * | 2/1997 | Venkitasubrahmanian .. 315/307 |
| 6,137,240 A | * | 10/2000 | Bogdan ...................... 315/307 |

FOREIGN PATENT DOCUMENTS

WO     WO 95/22194     8/1995

* cited by examiner

Primary Examiner—Don Wong
Assistant Examiner—Tuyet T. Vo
(74) Attorney, Agent, or Firm—Burns, Doane, Swecker & Mathis, LLP

(57) ABSTRACT

The electronic ballast may be fitted to a wide variety of third party lamps and is usually controlled to allow for a variety of light settings. A simple ballast circuit is provided in which both the ignition and regulation functions are carried out by the same inductor. This removes a switching stage resulting in better efficiency. The ignition energy of the lamp is progressively built up which helps reduce Radio Frequency Interference and reduces Electrical Magnetic Interference and reduces wear on the lamp components.

14 Claims, 7 Drawing Sheets

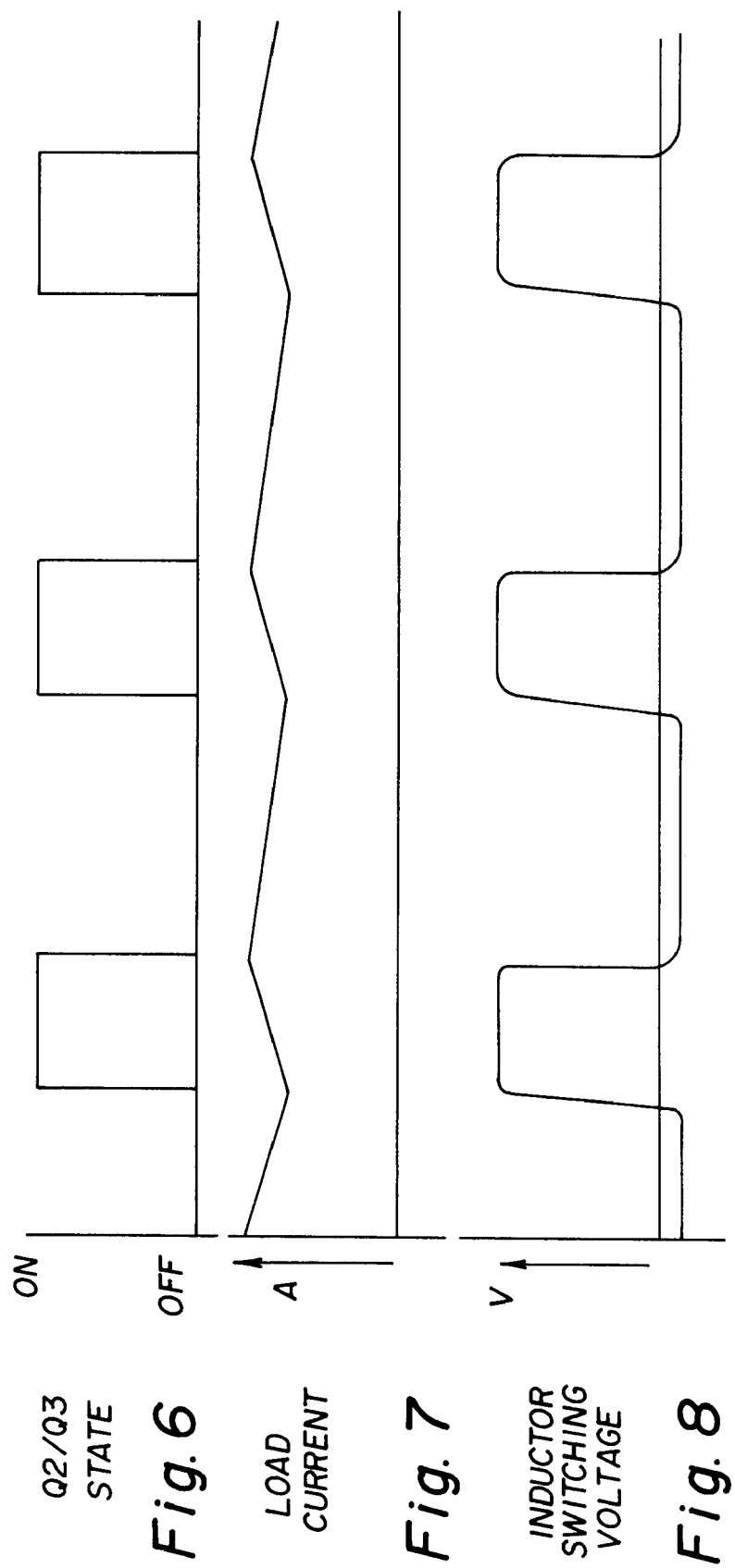

ELECTRONIC BALLAST FOR A GAS DISCHARGE LAMP

FIELD OF THE INVENTION

The invention relates to an electronic ballast or a gas discharge lamp, particularly but not exclusively for public, security, or amenity applications.

BACKGROUND OF THE INVENTION

Presently available ballasts generally suffer from a poor power factor, high energy consumption, inflexible control, and large physical weight and size.

There is therefore a need for an improved ballast to overcome these problems.

SUMMARY OF THE INVENTION

The invention provides an electronic ballast for a gas discharge lamp, the ballast comprising an input stage DC rectifier, a high frequency invertor connected to load terminals and a control circuit connected to a user interface.

Preferably, the control circuit is programmable. The user interface may receive signals via keys, radio or cellular signal, telephone fixed line, or mains cable. This is particularly useful for setting the lamp to a variety of light setting as desired by operators.

Preferably, the ballast comprises a single inductor for handling both the load high-frequency drive, and lamp ignition. In one embodiment, there is a tap off the drive inductor connected to ground via a capacitor and a switch in series, the switch being controlled by the control circuit to control progressive build up of ignition energy.

In one embodiment, the input stage of the ballast comprises an inductor having primary and secondary windings, whereby the primary windings are used to control charging of a snubbing capacitor and the secondary winding is used to allow discharge of the inductor when charging of the snubbing capacitor is complete and when the switching transistor switches off.

In one embodiment the ballast comprises a capacitor across the lamp terminals and a relay for isolating the capacitor during ignition. Preferably, the control circuit comprises means for controlling the pulse width of gate signals into the invertor switches to control the drive.

In another embodiment the ballast comprises switches for isolating the capacitor during ignition.

According to one aspect of the invention the ballast incorporates a lamp drive circuit.

Preferably the lamp drive circuit incorporates means for synthesis of a low frequency lamp drive waveform. These waveforms may be either square waves or sinusoidal beneficially overcoming incompatibilities with third party discharge lamps. One possible example of these incompatibilities is acoustic resonance of the internal mechanical parts of the lamp which reduces the lamp life.

Ideally the lamp drive circuit is formed for generation of a square wave lamp drive waveform. Beneficially presenting a lower crest factor, being the relationship between peak current and rms current, to further extend lamp life.

In a preferred embodiment the lamp drive waveform has a peak value of less than 1.4 times the root mean square value and in a particulary preferred embodiment the value is 1.1.

BRIEF DESCRIPTION OF THE DRAWINGS

The invention will be more clearly understood from the following description of some embodiments thereof, given by way of example only with reference to the accompanying drawings in which:

FIGS. 6, 7 and 8 are diagrams of various waveforms of the electronic ballast of FIG. 5;

DETAILED DESCRIPTION OF THE INVENTION

Figure 1:
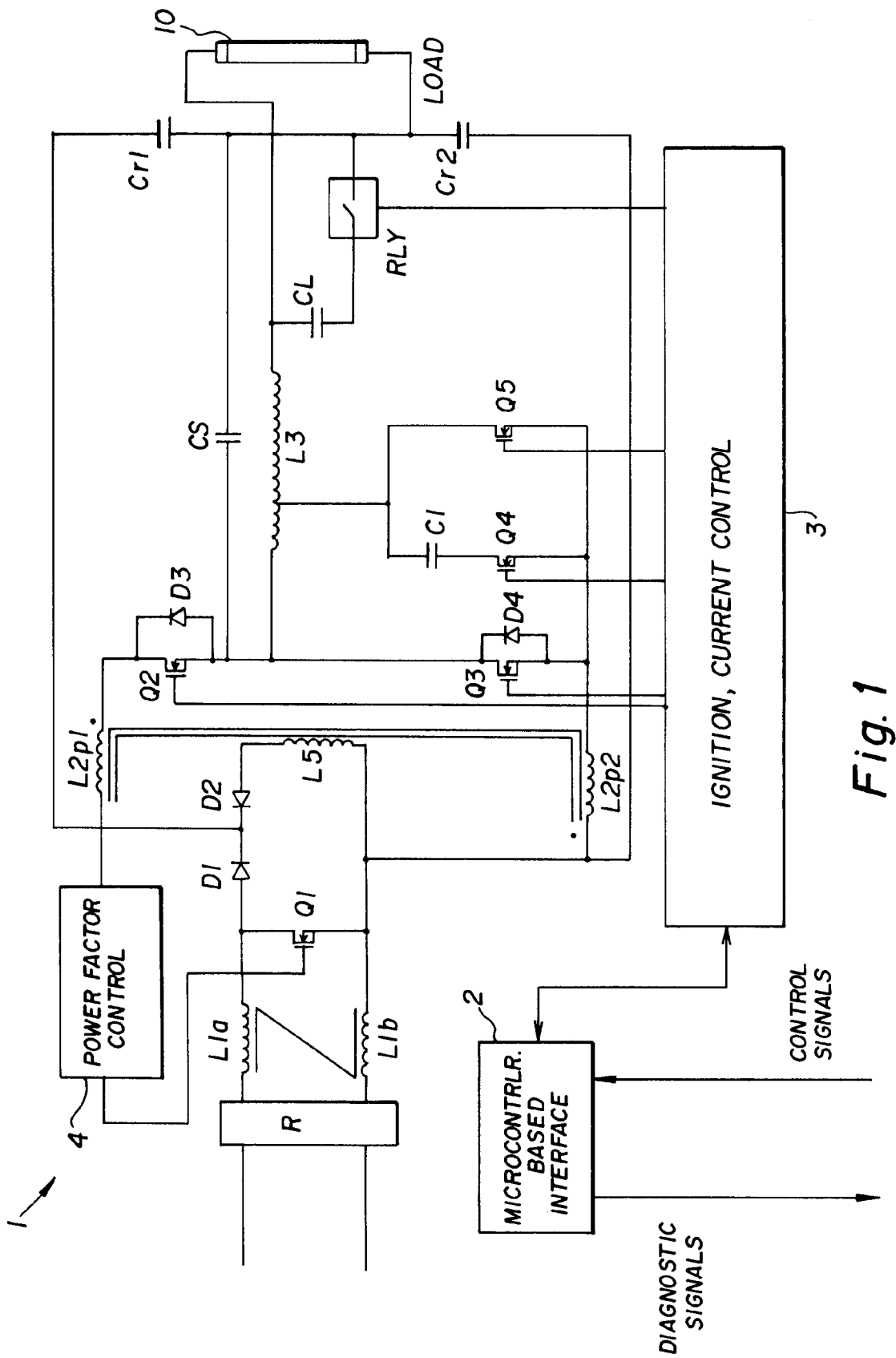
FIG. 1 is a schematic view of an electronic ballast of the invention.

Referring to FIG. 1 there is shown an electronic ballast 1 for a gas discharge lamp load 10. The ballast 1 comprises a microcontroller-based interface 2 for receiving inputs such as control signals. The interface 2 is connected to an ignition and current control circuit 3. The control circuit 3 comprises circuitry for controlling ignition of the Lamp load 10 using an inductor L3 (see below) and also monitors the current, voltage and power to the Lamp load 10.

The ballast 1 also comprises a power factor control circuit 4 which controls the operation of an inductor L1, a transistor Q1 and a diode D1.

The power-handling components of the ballast 1 may be grouped functionally somewhat as follows.

A DC bridge rectifier R, invertor MOSFET switches Q2 and Q3 having diodes D3 and D4 respectively, a drive inductor L3, a snubbing capacitor Cs, and a parallel lamp capacitor C1;

An input stage filtering inductor L1;

Power factor control components Q1, L1, D1, Cr1, Cr2, (Cr1 and Cr2 also operating as reservoir capacitors) and the control circuit 4;

Energy recovery components L2 and D2; and

Ignition components Ci, Q4, Q5, RLY.

Figure 2:
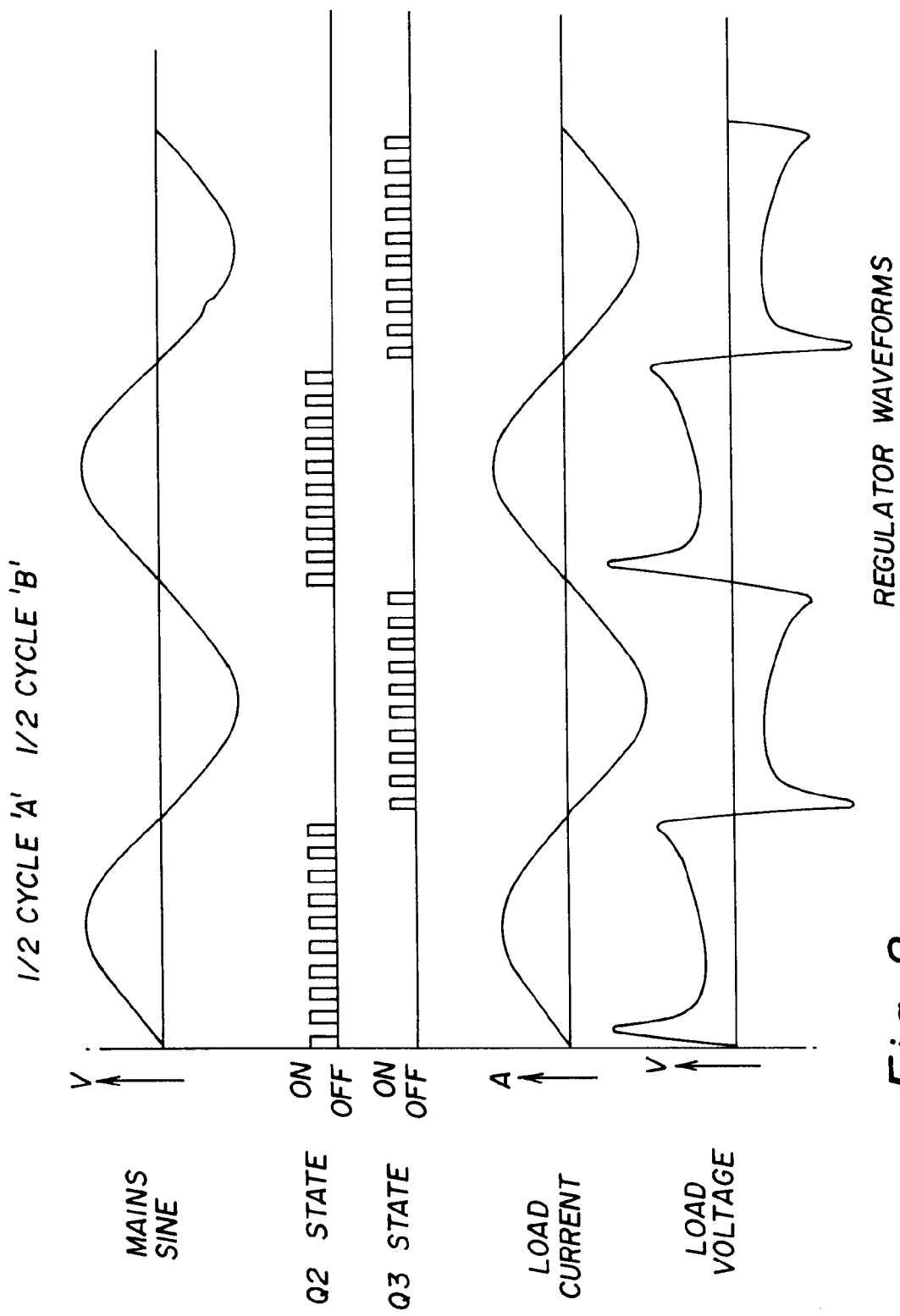
FIGS. 2, 3 and 4 are diagrams of various waveforms of the circuit.
Figure 3:
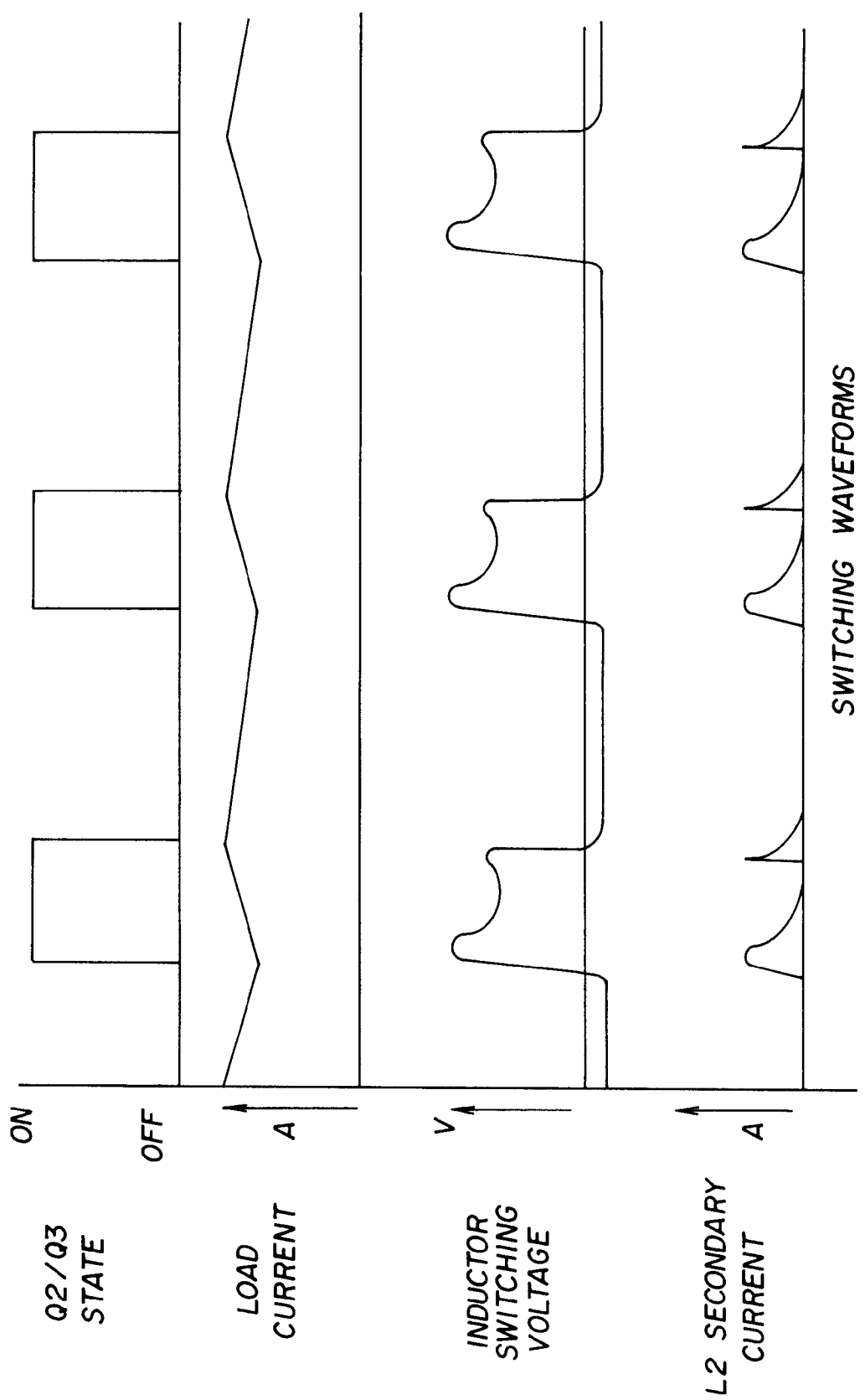
Figure 4:
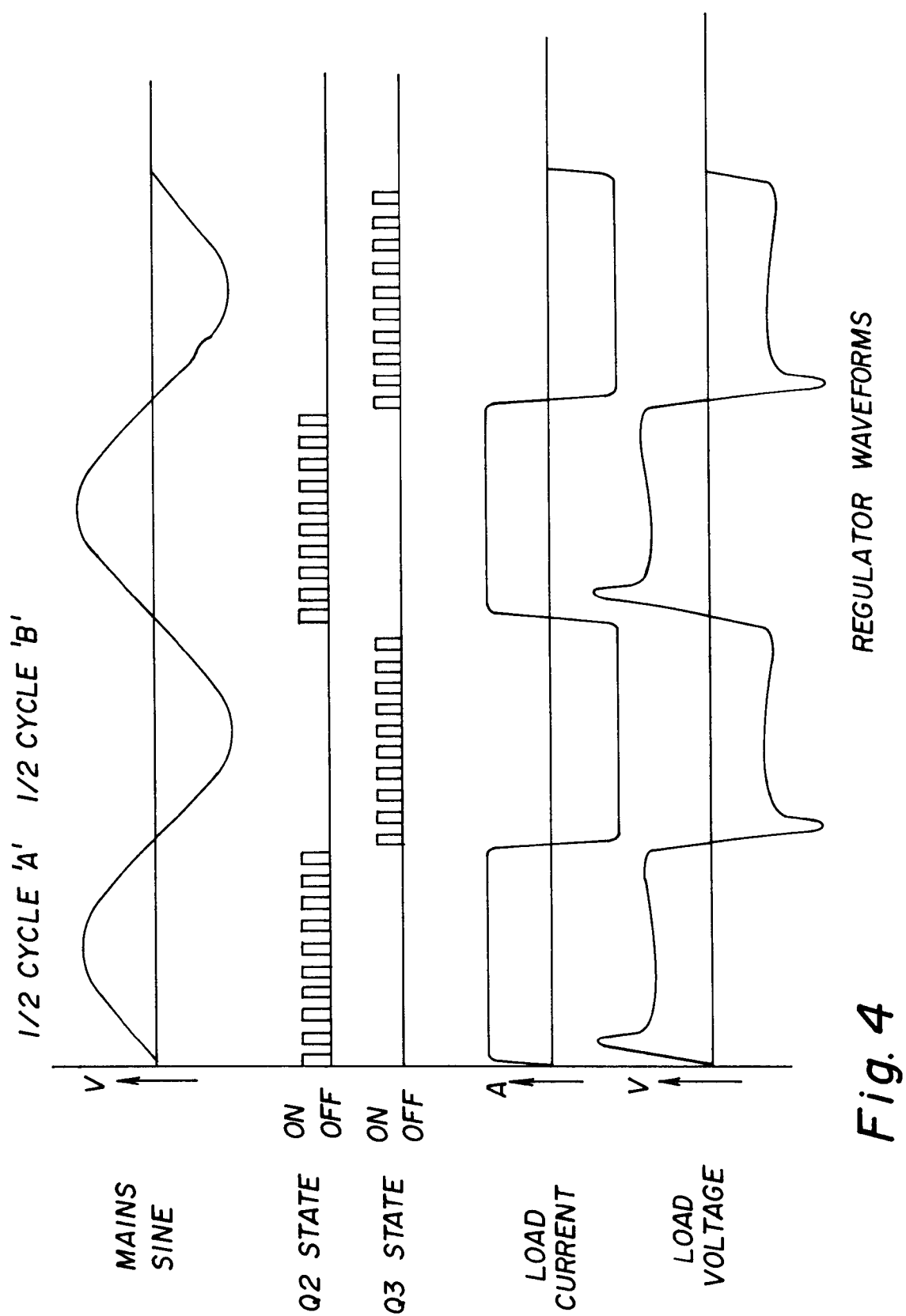

Referring also to FIGS. 2, 3, and 4 operation of the ballast 1 is now described.

The bridge Rectifier performs AC to DC rectification in a conventional manner. The inductor L1 filters the input, and as described below also assists in providing power factor correction. This filtering may also be provided externally by a dedicated mains filter as opposed to filtering assistance afforded by the inductor L1.

High frequency switching is performed by the transistors Q2 and Q3 which drive the load 10 via the inductor L3. For the mains half cycle A, Q2 pulses energy into L3 and the load at a level governed by the control circuit 3. On the mains half cycle B, Q3 pulses energy through L3 and the load, but in the opposite direction. An important aspect of this circuit 1 is that the control circuit 3 varies the pulse width of the drive signals to Q2 and Q3 because a current flow in L3 mirrors an internal reference level. This internal reference level is single-sided and directly proportional to the mains voltage. The capacitor C1 reduces RFI (radio frequency interference) and EMI (electrical magnetic interference).

For ignition, the tap from L3 connected to Ci, Q4 and Q5 provide for progressive build-up of energy. The sequence starts with Q2, Q4 and Q5 being driven into conduction, upon which a current flows through Q2, the inductor tap at L3, and Q5. This current increases steadily (at a rate determined by the voltage and the inductor value). Once the current has reached a value that imparts sufficient starting energy into the inductor, the transistor Q5 is turned off by the control circuit 3. Immediately, the voltage on Ci and on the voltage tap increases rapidly as the inductor seeks an alternative path for the current flowing through it. This voltage rise is reflected in a voltage pulse on the load equal to the tap ratio times the voltage on Ci. The high voltage generated causes lamp ignition. During ignition, the relay RLY is open for about 100 ms to isolate the filter components from these pulses. The ignition energy is escalated until the lamp ignites. The control circuit 3 starts with a modest pulse of about 1 kV peak amplitude. If a sequence of these fails to ignite the lamp, the pulse energy is increased to a higher voltage of 1.2 kV, and so on until the lamp ignites. It will be appreciated that by attempting ignition with pulses at lower peak amplitude, load stress is reduced and increases lamp life as well as reducing both RFI and EMI at ignition.

For power factor correction, the components set out above maintain a steady DC supply voltage of about 390 V. In addition to filtering the DC supply and power factor correction the split reservoir capacitors Cr1 and Cr2 provide a voltage divider ensuring that the voltage after switch on is approximately half the supply voltage. During the half cycle A Q2 pulses current through L3, the load and into Cr1 and Cr2. This causes the voltage at the Cr1, Cr2 junction to rise, however, because the capacitor Cr1 and Cr2 are large the voltage rise is minimal. During the half cycle B Q3 pulses energy through L3, the load 10 and the Cr1, Cr2 junction.

The control circuit 3 monitors the voltage on Cr1, Cr2 to ensure that it does not drift far from the half rail value. In the event that a drift does occur due to an imbalance between cycle A and cycle B the control circuit 3 corrects this by adjustment of relative cycle energies.

It will be immediately apparent that the split reservoir function described above may equally be achieved using a single capacitor and replacing Cr1 and Cr2 with transistors.

Similarly minor circuit modifications could be made and a H bridge configuration used.

Freewheeling between pulses is provided by either D3 or D4, depending on the half cycle, D4 being active during half cycle A and D3 being active during half cycle B. These diodes may be provided as inherent bulk/body diodes or as external diodes. Additional diodes may be added to prevent D3 and D4 contributing to overall circuit function.

Waveforms are illustrated in FIGS. 2 and 3. In more detail Q2 and Q3 are switched on and off during respective cycles A and B of the mains to drive current through L3, the load 10 and back to the Cr1 and Cr2 junction to produce the Load Current and Load Voltage wave forms shown. When switching Q2 and Q3 there is a need to dissipate energy which is fed back to the supply via L2p1 and L2p2.

Regarding the manner in which switching energy is recovered, when Q2 or Q3 conduct, current is drawn through the primary of L2. As D2 is reverse biased, L2 behaves as a pure inductor, causing the current to build up gradually. This allows the snubbing capacitor Cs to be charged without excessive current spikes. It also reduces the rate of voltage build up across the transistor and freewheeling diodes resulting in the near elimination of switching losses in these components, including the effect of Vrrm dissipation in the diodes. The charged snubbing capacitor in turn allows the inductor L3 to maintain current flow during the switch-off transition at the end of the cycle. Although Cs is fully charged the inductor Lp will try to maintain current flow and VCs will rise above the DC supply by a factor determined by the turns ratio between Lp and Ls. Current flow in L3 is transferred from the primary to the secondary with the diode now being forward biased. The inductor current is now returned to the supply rail. For this effect to take place, there must an appropriate primary to secondary ratio of: 1:4 which allows the voltage on Cs to rise to 125% the supply voltage.

By keeping the number of windings on the secondary larger than that of the primary, the primary voltage rise when Q2 or Q3 cease conduction can be controlled. Additionally the time taken for Ls to discharge its energy back to the supply rails may also be controlled. The associated waveforms are illustrated in FIG. 3. FIG. 4 illustrates the waveforms associated with operation if the load current is square in nature.

The above sets out the basic operation of the circuit, however, the interface 2, the control circuit 3, and the power factor control circuit 4 provide intelligence which allow additional features to be provided. The input signals may be provided via a light sensor or a lighting controller. These would indicate either the actual level of external illuminance, or that a particular threshold has been reached. This allows controlled switching on and off, or dimmed operation. Input signals may also be received from a radio module, or a mains module which allows the ballast to be remotely controlled via radio transmissions or via mains cable. Alternatively input signals may be received from a public telephone system, either fixed or cellular. A still further possibility is use of an infra-red receiver.

The interface 2 or the control circuit 3 may incorporate a real time clock, which may be maintained via long-wave radio signal as the 60 kHz MSF time signal which is the call sign for Standard Frequency and M is one of the prefixes used by the United Kingdom for station identification. Alternatively and astronomical timer could be incorporated.

A still further possibility is receipt of signals from a traffic monitoring system.

The control circuit 3 may incorporate an on-board look-up table of switching times, thus allowing operation independently of a light sensor.

Output signals from the control circuit 3 could indicate a wide range of diagnostic information about the operation of the system which will be invaluable to maintenance personnel. Some information could include lamp status, total hours on, total hours off, switching times, energy consumed, light output etc. This information could be transmitted to the maintenance personnel via radio transmission, infra red transmission, mains cabling, fixed or cellular telephone system or via satellite. This would eliminate the need for patrolling and would allow more accurate inventory control and information gathering. An important aspect is that operating costs for an organisation such as a County Council are dramatically reduced.

It will be appreciated that the invention provides a simple ballast circuit in which both the ignition and regulation functions are carried out by the same inductor (L3). This removes a switching stage, resulting in better efficiency.

The switching loss recovery technique allows efficiencies of up to 95% to be achieved in the main switching circuit. The benefits of this are that more energy is transferred to the load, there is minimum self heating, and there is greatly reduced stressing of components. Further, the manner in which the ignition energy is progressively built up helps to reduce RFI and EMI and reduces wear on the lamp components. It will be apparent that the switching loss recovery technique is particulary useful where low quality transistors are used. When this is not the case its usefulness is less critical.

The control circuit 3 may be programmed to gradually increase the lamp current and monitor the lamp voltage. At a low current the lamp is in its negative resistance zone where the lamp voltage drops with increased current. As the current increases a point is reached where the lamp voltage begins to increase again. This is the positive resistance zone. The optimum current is that which maintains the lamp just between both of these operating zones. The ballast will, once it has identified the optimum driving current select the standard power rating closest but below this in value. An alternative to this is to provide selector switches to set a particular power rating.

For dimming of the lamp, the current is held at a DC level slightly below the rms value of the lower intensity AC equivalent. The lamp light output intensity now decreases and the lamp begins to cool. After a time, the AC at the new lower level is reapplied. The DC current is alternated in polarity from dimming operation to normal operation to avoid lamp polarisation.

The control circuit 3 also incorporates a lamp drive circuit for synthesising a low frequency lamp drive waveform. These waveforms may be either square waves or sinusoidal waves to allow retro-fit connection of the ballast to a wide variety of lamps. When a square wave lamp drive waveform is generated by the control circuit 3 lamp life is extended as a result of a lower crest factor in the lamp.

Figure 5:
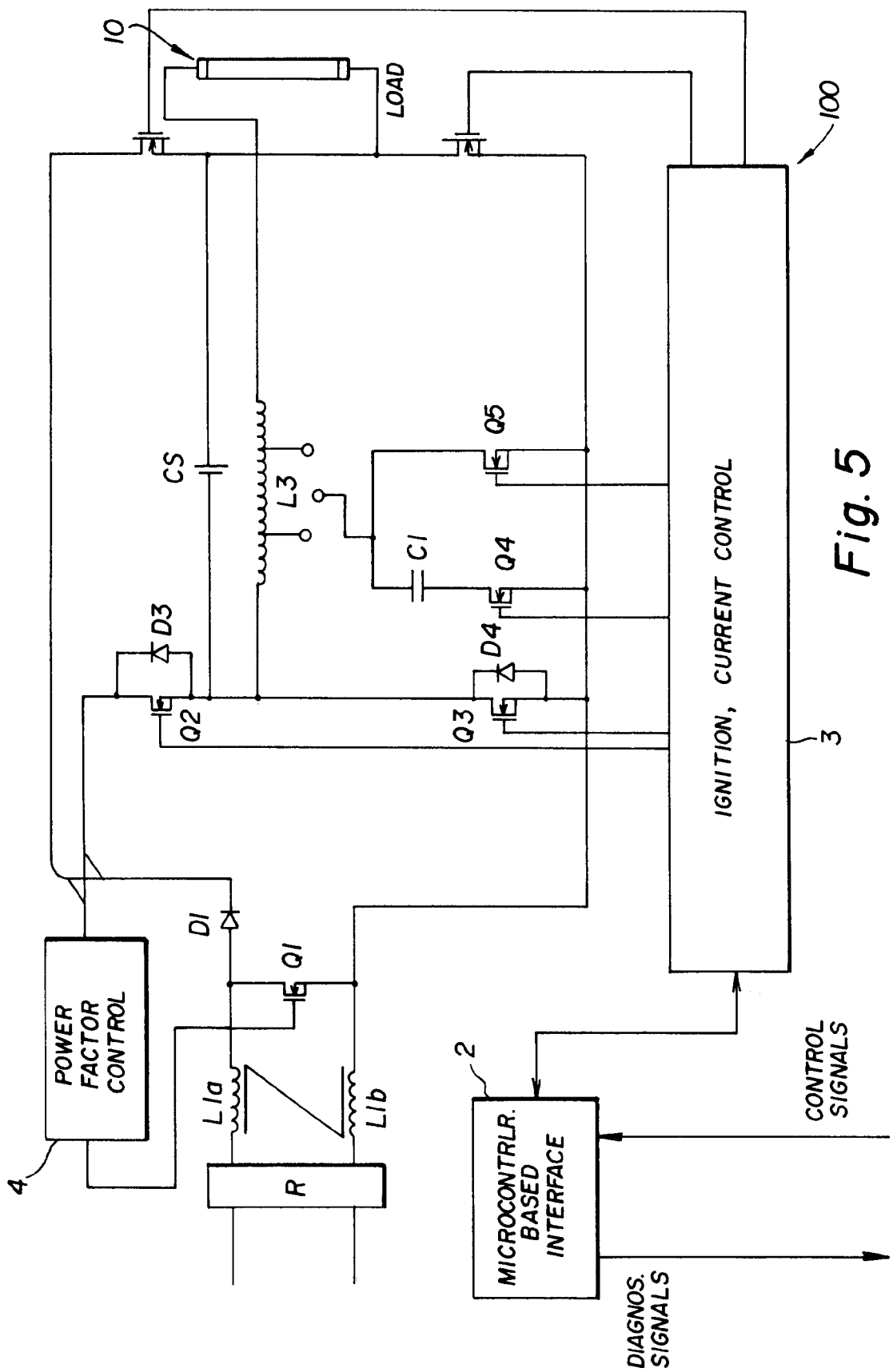
FIG. 5 is a schematic view of an alternative embodiment of an electronic ballast formed in accordance with the invention.

Referring now to FIG. 5 there is shown an alternative construction of electronic ballast indicated generally by the reference numeral 100 in which parts similar to those described in FIGS. 1 to 4 are identified by the same reference numerals generally. In this embodiment the ballast 100 shows the power factor/reservoir capacitors CR1 and CR2 replace by MOSFET devices. This reduces the cost of the ballast and overcomes difficulties associated with voltage loss which is particularly problematic in driving the lamp as it ages.

Figure 9:
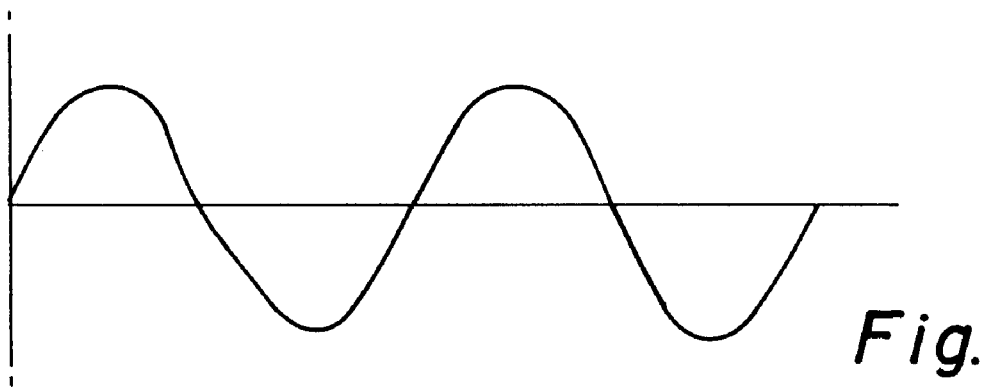
FIGS. 9 and 10 are diagrams of prior art lamp drive waveforms.

The ballast 100 has no energy recovery circuit, this is made possible by changing the transistors Q2 and Q3 to a higher power rating. It will be apparent that the reduction in complexity enhances both circuit efficiency and reliability as well as reducing construction costs. Further the relay RLY is no longer necessary as noise is longer a problem. A further modification to the ballast 100 is that the inductor L3 is provided with a number of taps which will allow the unit to control a variety of loads 10. The switch between the various taps may be achieved by way of a manual switch, selection pins or alternatively by an automatic detection circuit. FIGS. 6, 7 and 9 show respectively the transistor states, the load current and the inductor voltage waveforms for this embodiment.

Figure 10:
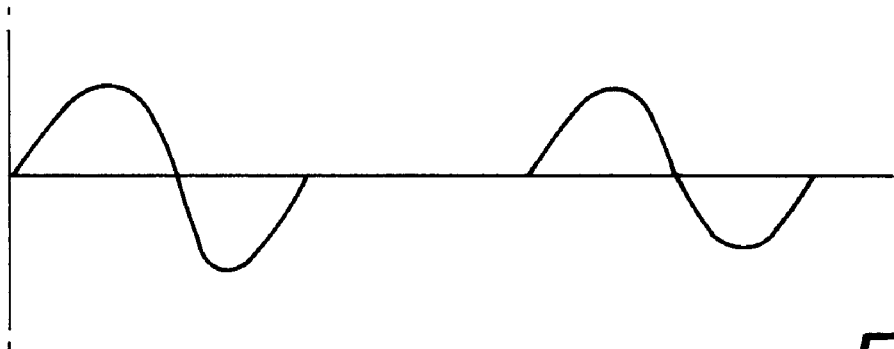
Figure 11:
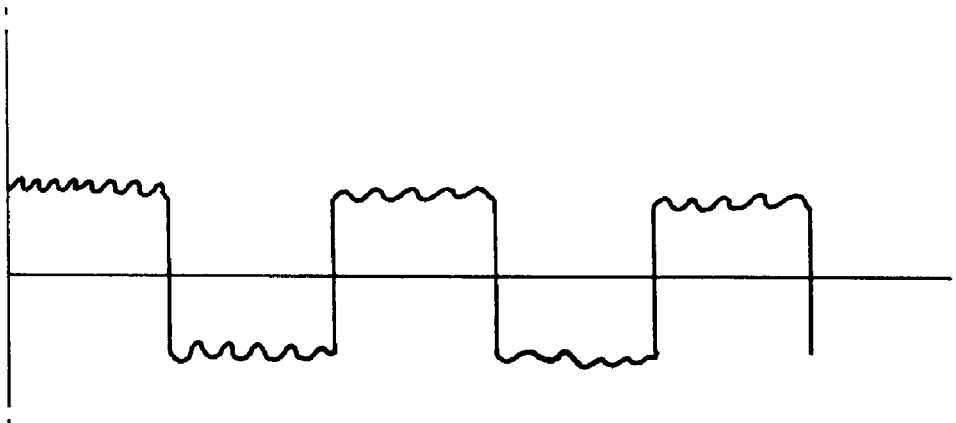
FIG. 11 is a diagram of a lamp drive waveform forming part of the invention.

The square wave lamp drive waveform generated by the control circuit referred to above is shown in FIG. 11. Prior art waveforms are shown in FIGS. 9 and 10. It will be evident to those skilled in the art that achieving a peak of 1.4 times the RMS value is often difficult, often these values will stray toward 1.6 times peak as a result of distortion from the magnetic ballast. Even where it is possible to achieve the theoretical value of 1.4 times peak the high crest factor associated with such waveforms can contribute to reducing lamp life due raised temperatures in the lamp. Using the square waveform shown in FIG. 11 has a number of advantages. Because the ripple is minimal the peak current does not exceed 1.1 times the RMS value and values close to unity are easily achievable. The lower crest factor in the lamp associated with the waveform of FIG. 11 in which the lamp waveform is synthesised provides a greater degree of frequency control and ensures that the risk of resonance is negligible as the frequency is close to the lamp optimum.

It will thus be apparent that the invention provides a significantly improved control circuit for a wide variety of lamps. Furthermore this control both adds to the functionality and extends the life of the lamp.

It will be appreciated that while using the minimum energy during ignition to fire the lamp extends the overall lamp life it also greatly reduces the radio frequency interference associated with ignition. This is particularly useful for geographical locations where a number of lamps are situated in close proximity.

It will be further appreciated that the gradual dimming possible with the current invention allows the lamp to operate at a great number of brightness settings. This represents an important feature of the invention in that previously lamps were operable in a limited number of brightness level setting dependent on ambient light and time.

The invention is not limited to the embodiments hereinbefore described, but may be varied in construction and detail.

What is claimed is:

1. An electronic ballast for a gas discharge lamp comprising:
   a control circuit;
   an input stage DC rectifier;
   a high frequency inverter connected to load terminals of the gas discharge lamp;
   a user interface connected to the control circuit;
   an inductor assembly, in communication with the high frequency inverter and the load terminals, having one inductor and a plurality of switches, the inductor assembly including
   means for, on switch-on of the gas discharge lamp, the inductor to control the ignition of the lamp, and
   means for, when ignition is complete, the inductor to control a low frequency drive current to the gas discharge lamp.

2. An electronic ballast as claimed in claim 1, wherein an input stage of the ballast comprises an input stage inductor having primary and secondary windings wherein the primary windings are used to control a switching transistor and charging of a snubbing capacitor and the secondary winding is used to allow discharge of the input stage inductor when charging of the snubbing capacitor is complete and when the switching transistor switches off.

3. An electronic ballast for a gas discharge lamp as claimed in claim 1, in which the high frequency inverter has two switches being switched on and off during each respective cycle to drive current through the inductor and to the gas discharge lamp.

4. An electronic ballast for a gas discharge lamp as claimed in claim 1, wherein the inductor can be tapped to control a plurality of loads.

5. An electronic ballast for a gas discharge lamp as claimed in claim 1, wherein the control circuit has means for determining optimum current for maximum performance of lamp operation.

6. An electronic ballast for a gas discharge lamp as claimed in claim 1, wherein the control circuit has means for adjusting power to a load when voltage switches from a predetermined value.

7. An electronic ballast for a gas discharge lamp as claimed in claim 1, wherein the control circuit has means for receiving input signals remotely.

8. An electronic ballast for a gas discharge lamp as claimed in claim 1, wherein the inductor assembly incorporates a tap off the inductor connected to ground via a capacitor and a switch in series, the switch being controlled by the control circuit to control progressive build-up of ignition energy.

9. An electronic ballast for a gas discharge lamp as claimed in claim 8, wherein the control circuit has means for gradually charging the capacitor.

10. An electronic ballast for a gas discharge lamp as claimed in claim 1, wherein the control circuit has means for incorporating a lamp drive circuit for synthesizing a low frequency lamp drive waveform.

11. An electronic ballast for a gas discharge lamp as claimed in claim 10, wherein the lamp drive waveform has a peak value of less than 1.4 times a root of a mean square value.

12. An electronic ballast for a gas discharge lamp as claimed in claim 11, wherein the peak value is 1.1 times the root of the mean square value.

13. An electronic ballast for a gas discharge lamp as claimed in claim 10, wherein a frequency of the lamp is controlled.

14. An electronic ballast for a gas discharge lamp as claimed in claim 1, wherein an optimum frequency control is achieved using a low crest factor.

* * * * *